United States Patent [19]
Lang

[11] Patent Number: 5,745,539
[45] Date of Patent: Apr. 28, 1998

[54] APPARATUS AND METHOD FOR PRIORITIZATION OF MULTIPLE COMMANDS IN AN INSTRUMENTATION AND CONTROL SYSTEM

[75] Inventor: Glenn E. Lang, Cabot, Pa.

[73] Assignee: Westinghouse Electric Corporation, Pittsburgh, Pa.

[21] Appl. No.: 557,532

[22] Filed: Nov. 14, 1995

[51] Int. Cl.$^6$ .................................................. G21D 3/04
[52] U.S. Cl. .......................... 376/259; 395/800; 364/184; 364/552
[58] Field of Search .................... 376/215, 216, 376/259; 364/184, 492, 527, 551.01, 552, 224.9, 921.8; 327/36, 365; 326/10; 395/182.9, 182.22, 800

[56] References Cited

U.S. PATENT DOCUMENTS

| | | | |
|---|---|---|---|
| 3,858,191 | 12/1974 | Neuner et al. | 376/258 |
| 3,895,223 | 7/1975 | Neuner et al. | 376/258 |
| 4,880,994 | 11/1989 | Richard | 326/10 |
| 5,511,223 | 4/1996 | Scecina et al. | 395/800 |
| 5,621,776 | 4/1997 | Gaubatz | 376/259 |

FOREIGN PATENT DOCUMENTS

| | | |
|---|---|---|
| 0 096 510 | 12/1983 | European Pat. Off. . |
| 0 250 317 | 12/1987 | European Pat. Off. . |
| 0 478 289 | 1/1992 | European Pat. Off. . |
| 0 526 418 | 3/1993 | European Pat. Off. . |
| 0 220 280 | 4/1990 | United Kingdom . |

*Primary Examiner*—Daniel D. Wasil

[57] ABSTRACT

Prioritization logic determines the final command applied to a process control component from a plurality of commands generated by diverse independent control subsystems, each utilizing different hardware and software to implement a common algorithm to preclude common mode failures. In one embodiment, priority is given to commands generated by one control subsystem, such as a safety grade subsystem, over commands provided by a second, non-safety grade control subsystem. In another embodiment, equal priority is given to commands from two control subsystems. In this case, ambiguous commands from either or both subsystems are ignored, but conflicting commands produce a final command which provides a safe state.

9 Claims, 5 Drawing Sheets

APPARATUS AND METHOD FOR PRIORITIZATION OF MULTIPLE COMMANDS IN AN INSTRUMENTATION AND CONTROL SYSTEM

BACKGROUND OF THE INVENTION

1. Field of the Invention

This invention relates to apparatus and method for instrumentation and control of processes such as the operation of a nuclear reactor. More particularly, it relates to such a method and apparatus for prioritizing multiple control signals provided to a component in a process control system.

2. Background of the Invention

Many instrumentation and control systems require duplication in at least some portions of the system for safety and reliability. This duplication may take the form of redundant systems. For instance duplicate sensors, controllers and actuators may be provided in separate independent channels to perform the identical function. Typically in such a case, the hardware and logic are identical in each channel.

In other cases, multiple, identical channels are provided to generate independent control signals which are voted to determine the final control signal to be applied to a single component. For instance, in a nuclear power plant, it is common to have protection systems which include four separate channels, each with its own sensors and controllers for generating a reactor trip signal in response to certain conditions in the plant. Voting logic trips the plant only if, for instance, two or more of the four channels generate a channel trip signal. In this instance also, it is conventional to have identical hardware and logic in each channel, thereby providing redundancy.

There is a growing concern over common mode failures in redundant instrumentation and control systems. By common mode failure, it is meant, simultaneous, similar failures in corresponding elements, either hardware or software, of the system. One application for which these concerns are raised is the retrofitting of existing process control systems, like some existing nuclear power plants, where it is desired to control a single component with commands from two separate subsystems. The two commands may have equal priority or different priority, such as where one subsystem is safety grade and the other is not. Where the signals have equal priority, provision must be made for resolving conflicts, always assuring that the plant remains in or is guided toward a safe state.

There is a need, therefore, for an improved instrumentation and control system and a method of operating the same which minimizes the possibility of common mode failures.

There is a particular need for such an improved apparatus and method which is applicable to a system in which commands from two subsystems are applied to a single component.

There is also a need for such an improved apparatus and method which assures that a process will always be maintained in or guided toward a safe condition.

There is another need for such an apparatus and method which can be used when the two logic control signals are of equal or unequal priority.

There is yet another need for such an apparatus and method which assures safe operation when the two commands are in conflict.

SUMMARY OF THE INVENTION

These needs and others are satisfied by the invention which is directed to apparatus and a method for controlling a process control component, such as, for example, in a nuclear reactor, using commands from multiple independent control means. While prior art instrumentation and control systems utilize redundant control means, that is, identical but independent control channels, to control a single component, the present invention utilizes diverse control means to form the independent control channels. By diverse control means it is meant that the processing means and/or the software utilized in the independent control means are different to preclude common mode failures. In the case of control means incorporating digital processors, this means that different types of processors, e.g. from different manufacturers, are used to run different routines implementing common algorithms. Prioritizing means receives the commands from the independent control means and determines a final command which is applied to the process control component. The process control component has at least two operating states, such as on/open and off/closed to which the component can be commanded by the final command from the prioritizing means. Preferably, this prioritizing means is diverse from each of the independent control means to further preclude common mode failures.

In the preferred embodiment of the invention, two diverse control means each generate commands for the single process control component. In one embodiment, the commands from one of the diverse control means is given priority. In a nuclear reactor application this could be the safety grade subsystem where only one of the two systems is safety grade. Where the independent control means can each generate an on command, an off command, or no command, an on command or off command from the control means with priority prevails. However, where the priority subsystem provides no command or an ambiguous command; that is, both an on command and an off command, commands from the nonpriority control means are utilized, unless it too provides no command or an ambiguous command. In the latter case, no command is provided to the process control component which maintains its existing state.

In another embodiment of the invention, the two independent diverse control means are given equal priority. In this case, identical commands are passed on to the process control component. If one control means gives no command, then the command from the other control means is used. If only one control means is providing an unambiguous command, it is used. If the two independent diverse control means of equal priority are providing conflicting commands, the prioritizing means generates a command which provides a safe state. The command providing a safe state may also be used to place a related component in a safe state. The command producing a safe state can also enable manual control for the component.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
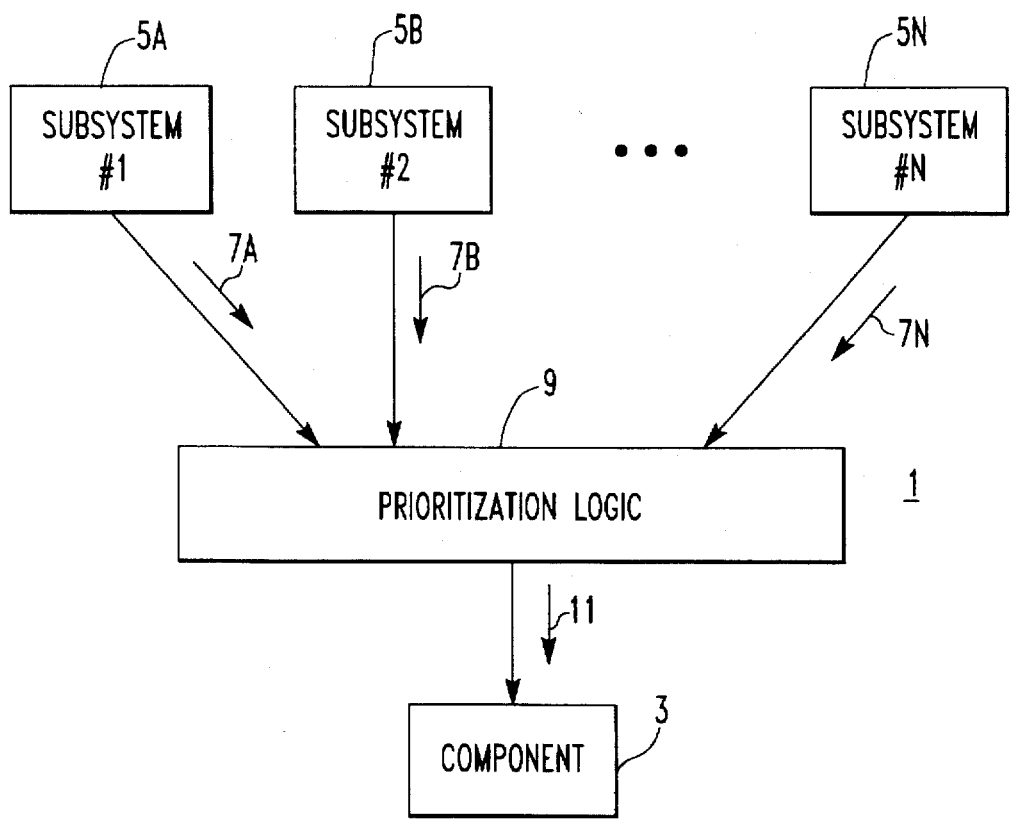
FIG. 1 is a schematic diagram of a portion of a process control system incorporating the invention.

FIG. 1 illustrates a control system 1 for controlling a component 3 such as a process control component in a process control system. The control system 1 includes a plurality of control subsystems 5A through 5N. Each of the subsystems 5A through 5N generates commands 7A through 7N for operating the component 3 to different operating states. The operating states of the component 3 can include, for instance, on and off states for components such as motors, pumps, and the like, and open and closed positions such as for valves, switches and the like. Prioritization logic 9 evaluates the commands 7A through 7N provided by the control subsystems 5A through 5N for determining a final command 11 which is provided to the component 3.

The control system 1 is a diverse system in that the control subsystems 5A through 5N are diverse. That is, each of these subsystems utilizes preferably both different hardware and software (if the hardware includes a microcomputer) to generate the associated commands 7A-7N. Thus, where the control subsystems 5A through 5N utilize microcomputers, the hardware is diverse in that microcomputers from different manufacturers are utilized. In addition, the common algorithm used by the independent control subsystems to generate the associated commands 7A-7N is implemented in different software language in each of the microcomputers. Where more than two independent control subsystems are used, it is preferred that they be diverse from each other, but it is within the scope of the invention that at least some of them are diverse. Also preferably, the prioritization logic 9 is diverse from each of the control subsystems 5A through 5N. In fact, in the preferred embodiment of the invention, the prioritization logic 9 is implemented with programmable array logic (PAL). This further precludes common mode failures.

The prioritization logic 9 generates the final control signal 11 applied to the component 3 using a selected logic. In one embodiment of the invention, equal priority is given to the commands generated by the independent control subsystems 5. Table 1 illustrates the logic applied where there are two independent control subsystems, each of which is given the same priority.

TABLE I

Typical Priority Logic for a Component With
Commands From Two Subsystems With Equal Priority

| | Subsystem #2 Commands | | | |
|---|---|---|---|---|
| Subsystem #1 Commands | No Command | ON Command | ON and OFF Commands | OFF Command |
| No Command | None | ON | None | OFF |
| ON Command | ON | ON | ON | Safe State |
| ON and OFF Command | None | ON | None | OFF |
| OFF Command | OFF | Safe State | OFF | OFF |

The commands indicated in the table represent the final command 11 provided by the prioritization logic 9 to the component 3. It will be noted that the commands provided by the control subsystems have three states: ON, OFF, and no command. Obviously, where the commands generated by the two subsystems agree, the final command corresponds. Where one subsystem generates an ON or OFF command and the other generates no command, the former command is used for the final command. This situation could occur where one of the subsystems has failed, for instance. Where one of the subsystems generates an ambiguous command, such as a simultaneous ON and OFF command, the command generated by the other subsystem is used, unless both subsystems generate an ambiguous command in which case no command is provided to the component. Where the commands generated by the two subsystems are in conflict; that is, one generates and ON command and the other generates an OFF command, the prioritization logic 9 generates a command which produces a safe state. The command used to produce this safe state depends upon the component, and in some cases, its function in the process control system. Thus, the safe state could be an ON command, an OFF command, or no command. Preferably, the command which produces a safe state also enables manual control so that the operator may take over the operation of the component.

Figure 2:
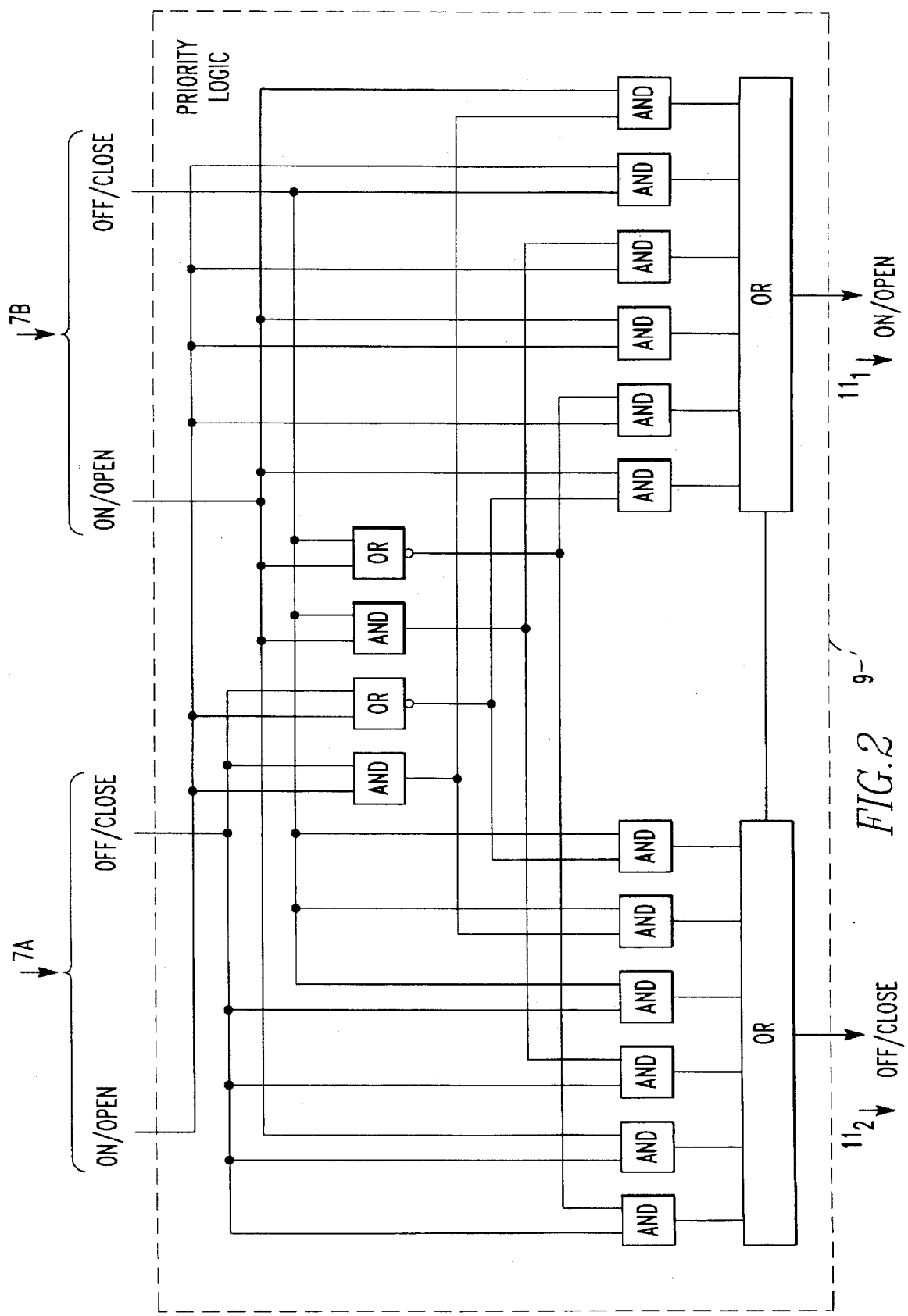
FIG. 2 is a schematic diagram of a prioritizer forming part of the control system illustrated in FIG. 1 in accordance with a first embodiment of the invention wherein the control subsystems are given equal priority.

FIG. 2 illustrates prioritization logic 9 implemented by a PAL configured to provide the logic of Table 1. The commands 7 from each of the control subsystems are input to the PAL 9 as either an ON/OPEN command or an OFF/CLOSE command and are represented by a high logic signal on the appropriate input. The logic of Table 1 is implemented by AND, OR and NOR gates to generate the final command at output $11_1$ which generates an ON/OPEN command, or output $11_2$, which generates and OFF/CLOSE command. Again, the output generates a high logic signal for the appropriate output. The no command output is represented by low-level logic signals on both of the outputs. When the commands 7A and 7B are in conflict, an ON/OPEN final command is generated to provide the safe state.

In accordance with another embodiment of the invention, priority is given to one of two control subsystems 5 providing commands for the component 3. An example of such logic is illustrated in Table 2 wherein subsystem 1 is given priority over subsystem 3. This embodiment could be utilized, for instance, where one subsystem is more reliable, for instance, safety grade in the case of a nuclear reactor, or more secure, than the other subsystem.

TABLE II

Typical Priority Logic for a Component With
Commands From Two Subsystems In Which
One System has Priority

| | Subsystem #3 Commands | | | |
|---|---|---|---|---|
| Subsystem #1 Commands | No Command | ON Command | ON and OFF Commands | OFF Command |
| No Command | None | ON | None | OFF |
| ON Command | ON | ON | ON | ON |
| ON and OFF Command | None | ON | None | OFF |
| OFF Command | OFF | OFF | OFF | OFF |

As can be seen, the command from the priority subsystem, subsystem No. 1 in the example, predominates unless it is ambiguous (simultaneously generating ON and OFF commands) in which case the command from subsystem No. 3 is used. If both subsystems are generating ambiguous signals, then no final command is provided to the component 3.

Figure 3:
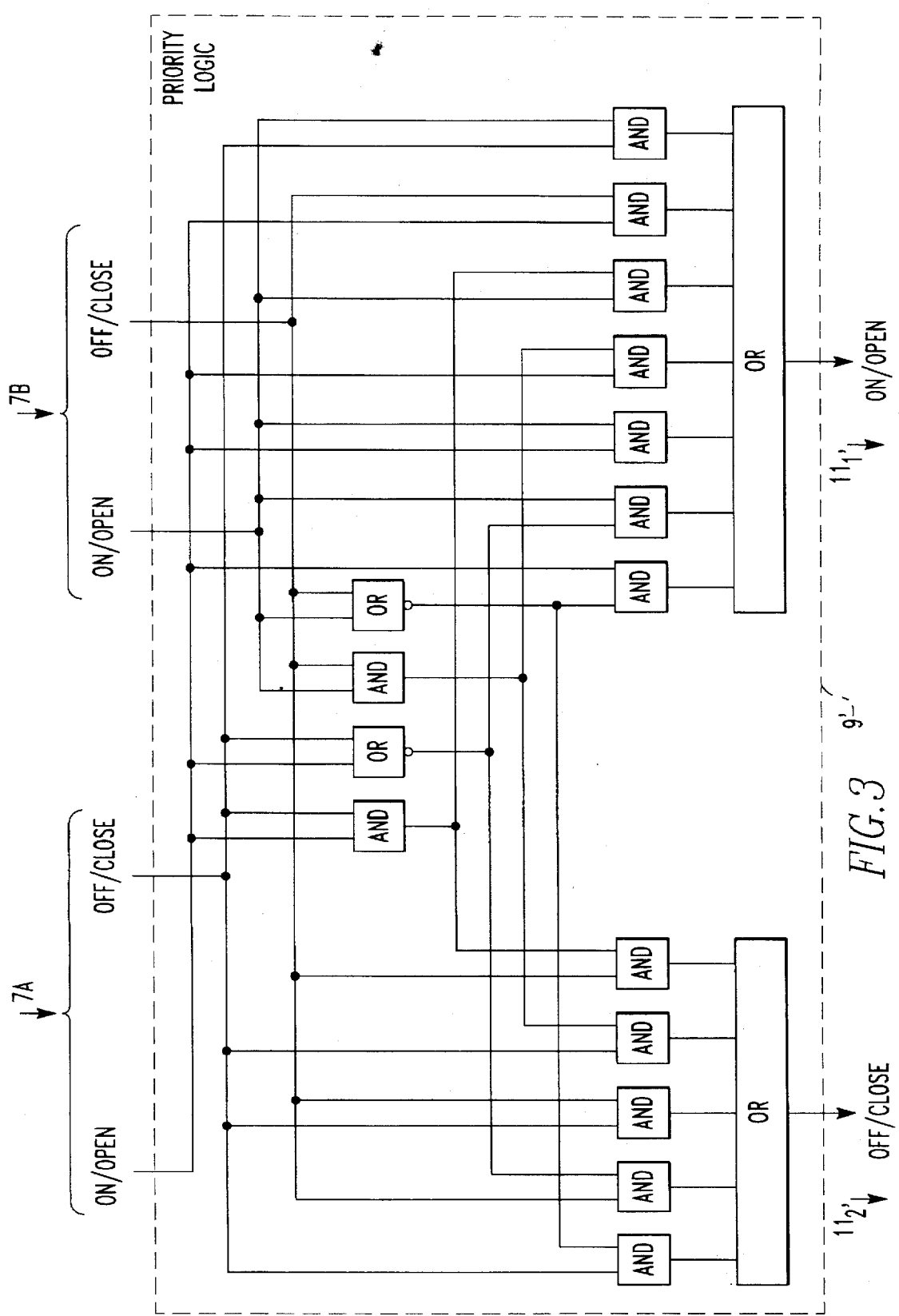
FIG. 3 is a schematic diagram similar to FIG. 2 illustrating another embodiment of the invention in which one of the control subsystems is given priority over the other.

FIG. 3 illustrates an example of a second embodiment of the prioritizing logic 9' implementing the logic of Table 2 in which one of the control subsystems, in the case, the first control subsystem 5A, has priority. Again, the exemplary logic is implemented by AND, OR and NOR gates in a PAL. In this case, the command 7A provided by the first control subsystem prevails. Again, the command can be an ON/OPEN command on one input, an OFF/CLOSED command on a second input, or no command in which case both inputs are low. Only when the first control subsystem 5A provides an ambiguous input by providing high signals on both the ON/OPEN and OFF/CLOSED inputs does the PAL 9' generate a final command using the command from the subsystem 5B. It can be seen from FIG. 3, that when both subsystems are providing both ON and OFF commands to the PAL 9', both the ON/OPEN output $11'_1$ command and the OFF/CLOSED output command $11'_2$ are low, providing no final control signal. In such a case, the controlled component will remain in the state that it is in.

Figure 4:
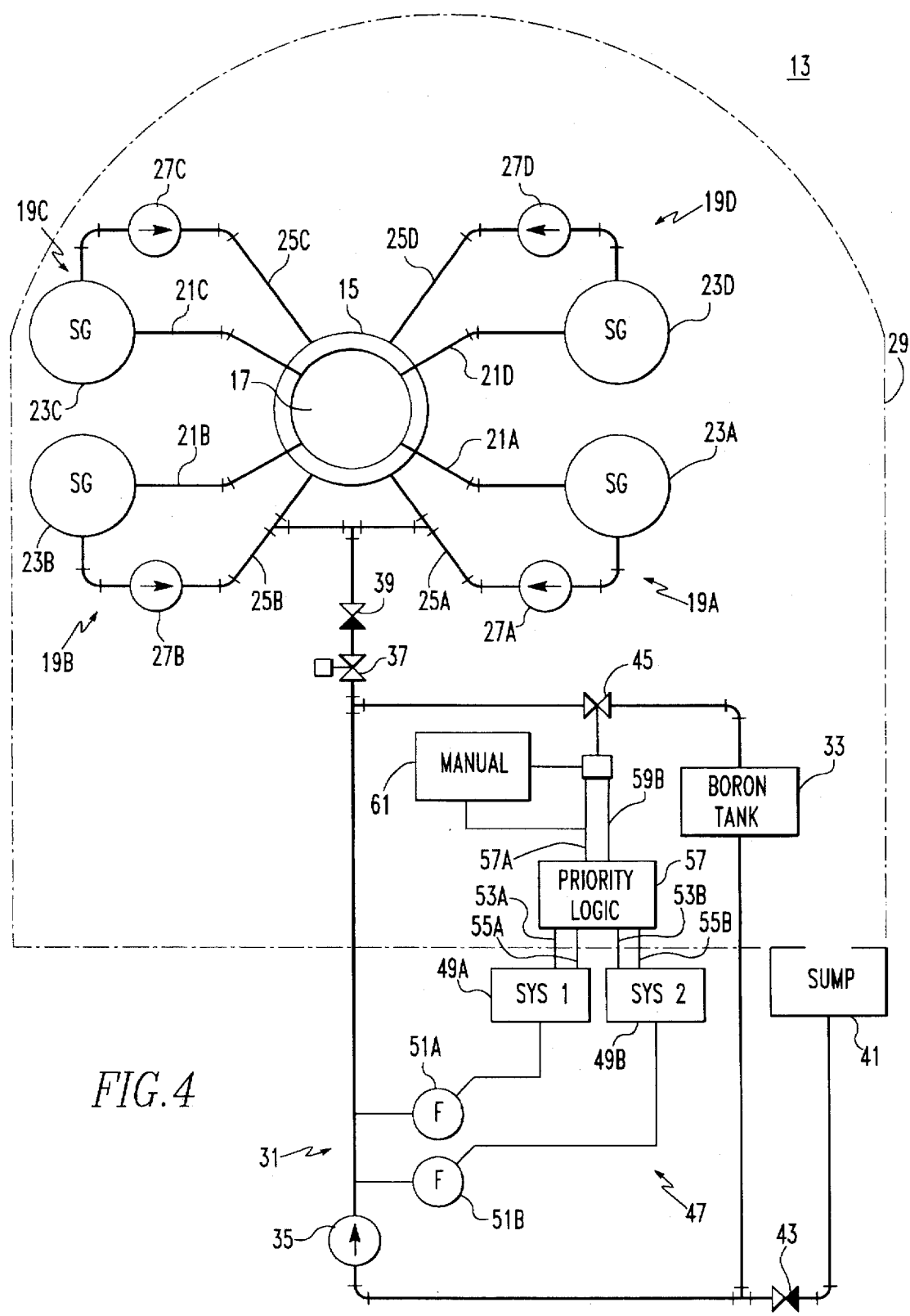
FIG. 4 is a schematic diagram of a pressurized water reactor nuclear steam supply system illustrating application of the first embodiment of the invention.

FIG. 4 illustrates application of the invention to a pressurized water reactor (PWR) nuclear steam supply system (NSSS) 13 in accordance with the first embodiment in which signals from a pair of control subsystems are given equal priority. The NSSS 13 includes a reactor vessel 15 having a core 17 of fissionable material. Reactor coolant in the form of light water is passed through the core 17 where it is heated by the fission reactions. The heated coolant is circulated in four primary loops: 19A-19D. Each primary loop 19 includes a hot leg 21A-21D which delivers heated coolant to a steam generator 23A through 23D. The steam generators 23 use the heat carried by the coolant to generate steam in secondary loops (not shown) to drive turbine generators which produce electric power. Coolant is returned to the reactor vessel 15 through cold legs 25A through 25D by reactor coolant pumps 27A through 27D.

The reactor vessel 15 and the primary loops 19A-19D are housed within containment 29. In the event of a depressurization in the primary loops 19 such as could occur with a break in one of the loops, causing a loss of coolant, a safety injection system 31 injects borated water from a boron tank 33 into the primary system through the cold legs 25A and 25B, in the example. The emergency supply of water is pumped by a safety injection pump 35 through a motor-operated discharge valve 37 and a check valve 39. Additional water for safety injection can be drawn from a sump 41 into which water from a broken line and condensation from escaping steam accumulates. This additional supply of water is drawn through a check valve 43. Recirculation valves 45 (only one shown) protect the safety injection pump 35 by providing a recirculating path for the output of the safety injection pump should excessive resistance to flow or a closed discharge valve 37 be encountered. The recirculation valve 45 is opened if the pump 35 is running but its flow rate is below a minimum threshold. In order to assure proper operation of the recirculation valve 45, the control system 47 for this valve includes two independent control subsystems 49A and 49B, each of which has its own separate flow indicator 51A or 51B. Control subsystems 49A and 49B separately compare the flow indication provided by the flow indicator 51A or 51B to the predetermined threshold in generating a command to the recirculation valve 45. Each of these control subsystems 49A and 49B can generate an OPEN command on a lead 53A and 53B, respectively, or a CLOSE command on leads 55A and 55B. Priority logic 57, implementing the equal priority logic of Table 1 from the commands received from the control subsystems 49A and 49B, generates a final command which is an OPEN command on lead 59A or a CLOSED command on lead 59B. In this particular situation, the safe state for the recirculation valve 45 is the OPEN position to prevent burnup of the safety injection pump 35. Therefore, when conflicting commands are generated by the control subsystems 49A and 49B, the valve 45 is commanded open and manual control 61 is enabled. A PAL configured as in FIG. 2 is suitable for use as the priority logic 57.

Figure 5:
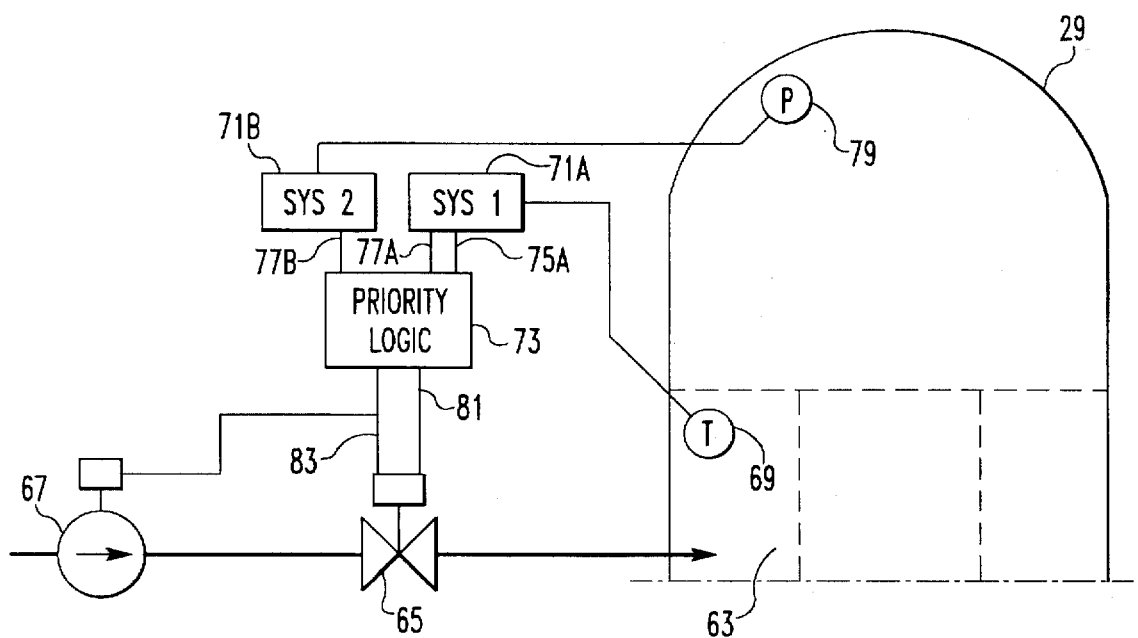
FIG. 5 is a schematic diagram of a portion of a nuclear steam supply system illustrating application of a second embodiment of the invention in which one of the control subsystems is given priority.

FIG. 5 illustrates an application of the second embodiment of the invention, where priority is given to one control subsystem over another. This example involves the ventilation system for compartment 63 in containment 29. Motor controlled damper 65 controls the flow of ventilating air provided by HVAC fan 67. Normally, the damper 65 is controlled on temperature in the compartment 63 as measured by the sensor 69. A first control subsystem 71 uses the temperature signal to generate a command, either open or close to priority logic 73. As mentioned, the command 7A provided by the control subsystem 5A is provided on two leads 75A and 77A. Containment pressure is monitored by a pressure sensor 79. This pressure is provided to the second diverse control subsystem 71B. If the pressure in containment exceeds a selected limit, the control subsystem 71B generates a CLOSE command. This a safety signal and is given priority by the priority logic 73 which then generates a final close command which is applied to the damper 65 to close the damper and therefore isolate containment. In this example, the pressure sensor 79 and control subsystem 71B are protection grade, while the temperature sensor 69 and control subsystem 71A are not. Thus, the pressure generated CLOSE command is more reliable, and, in any event, represents a safety condition which must be addressed. It should be noted, that in the example, the subsystem 71B only provides a CLOSE command on the lead 77B. Thus, in the absence of a safety signal, no command is provided to the priority logic 73 by the subsystem 71B, and hence the commands from the subsystem 71A are used by the priority logic 73 to control the damper 65.

In the example of FIG. 5, the priority logic 73 generates an ON/OPEN final command to the damper 65 on output 81 and an OFF/CLOSE final command on output 83. In order to place the plant in a safe condition, the OFF/CLOSE final command applied to the damper 65 is also applied to the fan 67 in order to assure that the fan 67 does not burn up by continuing to run when the damper 65 is closed. A PAL configured as in FIG. 3 can be used for the priority logic 73.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given full breadth of the claims appended and any and all equivalents thereof.

What is claimed is:

1. An instrumentation and control system for a nuclear reactor comprising:
   a process control component operable to at least two operating states in response to a final command;
   first independent control means generating a first command for operating said process control component to one of said operating states;
   second independent control means diverse from said first independent control means and generating a second command for operating said process control component to one of said operating states; and prioritizing means generating said final command for operating said process control component to an operating state commanded by both said first command and said second command when said first command and second command command a same operating state, and to the operating state commanded by the other of said first command and second command when one of said first command and second command is ambiguous.

2. The system of claim 1 wherein said prioritizing means comprises means which gives said first command priority over said second command in generating said final command except when said first command alone is ambiguous.

3. The system of claim 2 wherein said prioritizing means includes means using said second command to generate said final command when said first command is ambiguous.

4. The system of claim 1 wherein said prioritizing means comprises means which gives equal priority to said first command and said second command and generates said final command providing a safe state when said first command and second command command different ones of said operating states.

5. The system of claim 4 wherein said nuclear reactor includes a related device to said process control component and means applying said final command providing said safe state to said related device in providing said safe state.

6. The system of claim 2 wherein said first independent control means is safety grade and said second independent control means is non-safety grade.

7. The system of claim 1 wherein said first independent control means and said second independent control means each include as means generating said first command and said second command respectively, a first output commanding a first operating state when actuated and a second output commanding a second operating state when actuated and wherein a command is ambiguous when both said first and second outputs are actuated simultaneously.

8. The system of claim 1 wherein said prioritizing means comprises means diverse from each of said diverse first independent control means and second independent control means.

9. The system of claim 1 wherein said diverse first independent control means and said second independent control means comprise different microcomputer means running different software to implement a common algorithm.

* * * * *